(12) United States Patent
Xiao et al.

(10) Patent No.: US 10,289,634 B2
(45) Date of Patent: May 14, 2019

(54) DATA CLUSTERING EMPLOYING MAPPING AND MERGING

(71) Applicant: FREESCALE SEMICONDUCTOR, INC., Austin, TX (US)

(72) Inventors: Xiong Xiao, Shanghai (CN); Zhenyong Chen, Shanghai (CN); Xianzhong Li, Shanghai (CN)

(73) Assignee: NXP USA, INC., Austin, TX (US)

( * ) Notice: Subject to any disclaimer, the term of this patent is extended or adjusted under 35 U.S.C. 154(b) by 431 days.

(21) Appl. No.: 15/256,633

(22) Filed: Sep. 5, 2016

(65) Prior Publication Data

US 2017/0132307 A1   May 11, 2017

(30) Foreign Application Priority Data

Nov. 11, 2015  (CN) .......................... 2015 1 1035936

(51) Int. Cl.
  *G06F 16/28*   (2019.01)
(52) U.S. Cl.
  CPC .................................. *G06F 16/285* (2019.01)
(58) Field of Classification Search
  CPC ......... G06F 17/30598; G06F 17/30705; G06F 17/30713; G06F 17/3071; G06F 16/285
  See application file for complete search history.

(56) References Cited

U.S. PATENT DOCUMENTS

| | | | |
|---|---|---|---|
| 8,166,035 B2 | 4/2012 | Tsai et al. | |
| 8,400,458 B2 | 3/2013 | Wu et al. | |
| 8,429,166 B2 | 4/2013 | Tsai et al. | |
| 8,855,712 B2 | 10/2014 | Lord et al. | |
| 2002/0147703 A1* | 10/2002 | Yu | G06F 17/30327 |
| 2007/0255707 A1* | 11/2007 | Tresser | G06F 17/30592 |
| 2008/0010245 A1 | 1/2008 | Kim et al. | |

OTHER PUBLICATIONS

An Introduction to Cluster Analysis for Data Mining, pp. 1-75. (Year: 2000).*
Jain, Data clustering: 50 years beyond K-means, pp. 651-666 (Year: 2010).*
Ming-Chuan, An Efficient Fuzzy C-Means Clustering Algorithm, pp. 225-232. (Year: 2001).*

(Continued)

*Primary Examiner* — Albert M Phillips, III
(74) *Attorney, Agent, or Firm* — Charles E. Bergere (57) ABSTRACT

A data-clustering method generates data clusters for a set of data points. A region of interest containing the data points and a center matrix for the region of interest are defined, where the center matrix includes an array of center points defining centers of overlapping circles. The data points are mapped to corresponding circles based on near center points. Pairs of overlapping circles are merged based on relative numbers of data points lying in overlap regions of the pairs of overlapping circles compared to total numbers of data points within the corresponding circles. Circles belonging to the one or more data clusters are identified based on merged pairs of overlapping circles, and data points belonging to the one or more data clusters are identified based on the corresponding circles. The method may be performed by a computer having a heterogeneous architecture with parallel processors.

13 Claims, 5 Drawing Sheets

(56) References Cited

OTHER PUBLICATIONS

R. Farivar, D. Rebolledo, E. Chan, and R. Campbell, "A Parallel Implementation of K-Means Clustering on GPUs", Proceedings of International Conference on Parallel and Distributed Processing Techniques and Applications (PDPTA), 2008, pp, 340-345.

You Li, Kaiyong Zhao, Xiaowen Chu, and Jiming Liu, "Speeding up K-Means Algorithm by GPUs", Journal of Computer and System Sciences 79, 2013, pp. 216-229.

Bai, Hong-Tao; He, Li-Ii; Ouyang, Dan-tong; "K-Means on Commodity GPUs with CUDA", 2009 WRI World Congress on Computer Science and Information Engineering, vol. 7, Mar. 31-Apr. 2, 2009. pp. 651-655.

Chuntao Hong et al., "MapCG: Writing Parallel Program Portable between CPU and GPU", PACT '10, Sep. 11-15, 2010, Vienna, Austria, ACM 978-1-4503-0178-7/10/09, 2010. 10 pages.

\* cited by examiner

DATA CLUSTERING EMPLOYING MAPPING AND MERGING

BACKGROUND

The present invention relates to computer-implemented data processing and, more particularly, to data clustering techniques for such applications.

In the era of big data, data processing applications, such as data mining, are benefiting both commercial activity and people's daily lives. Clustering, in which a set of data is organized into multiple subsets (a.k.a. data clusters) based on one or more data characteristics or attributes, plays a critical role in many data mining applications. In general, the larger the set of data, the greater the volume of computations and the greater the transmission bandwidth involved in implementing a data clustering algorithm.

It is known to implement a conventional data clustering algorithm, such as the K-means data clustering algorithm, on a heterogeneous platform having multiple processors of different types operating in parallel, such as a central processing unit (CPU) and multiple graphics processing units (GPUs), to try to perform data clustering in a reasonable amount of time and at a reasonable cost. Unfortunately, for large sets of data, such solutions still take prohibitively long to execute. Thus, it would be advantageous to have a more efficient data clustering method.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In one embodiment, the present invention provides a computer implemented method for generating one or more data clusters for a set of data points. The computer defines a region of interest containing the data points. The computer defines a center matrix for the region of interest, wherein the center matrix comprises an array of center points defining centers of overlapping circles. The computer maps the data points to corresponding circles based on near center points and determines whether to merge adjacent pairs of overlapping circles based on the mapped data points. The computer identifies circles belonging to the one or more data clusters based on merged pairs of overlapping circles and identifies data points belonging to the one or more data clusters based on the identified circles.

Figure 1:
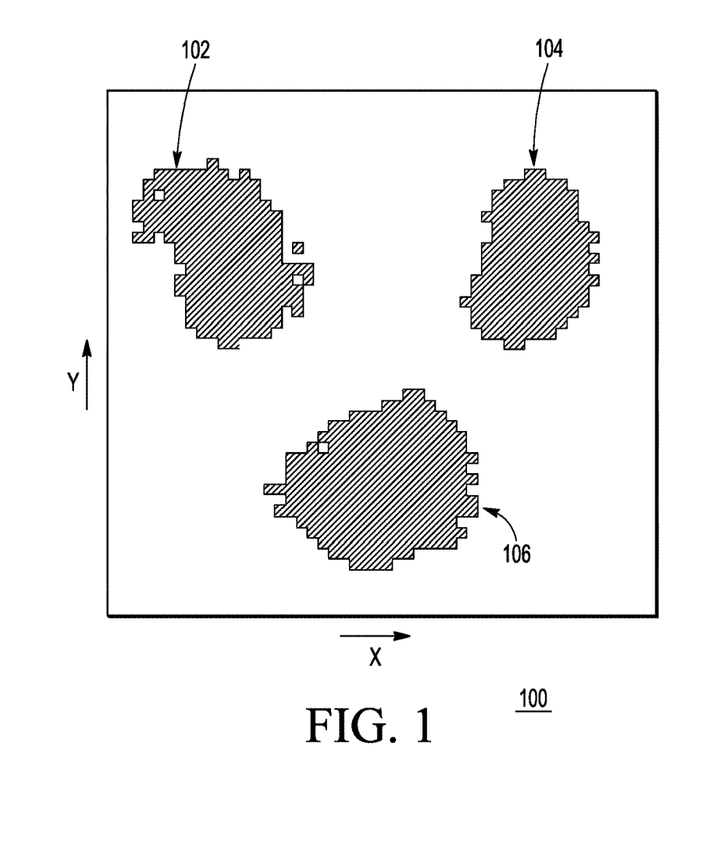
FIG. 1 is a graphical representation of a two-dimensional image corresponding to a set of data to be clustered.

Referring now to FIG. 1, a graphical representation of a two-dimensional image 100 corresponding to a set of data to be clustered is shown. In this graphical representation, each datum in the set is represented as a black point in a two-dimensional space, where each datum has (i) a first characteristic that maps to a coordinate in the X direction of a Cartesian coordinate system and (ii) a second characteristic that maps to a coordinate in the Y direction of that Cartesian coordinate system. In some data processing applications, such as in optical character recognition (OCR) and other image processing applications, the data are actually the points of the two-dimensional image 100, and the graphical representation of FIG. 1 directly represents that image. In other data-processing applications, the data set has nothing to do with two-dimensional imagery, and the image 100 of FIG. 1 is merely a graphical representation of the data in that set.

Those skilled in the art will also understand that, in other data-processing applications, the data to be clustered have more than two different types of characteristics or even just one type of characteristic. The two-dimensional data set of FIG. 1 is just a convenient and accessible way to explain the data-clustering algorithm of the present invention. Those skilled in the art will understand how to apply that data clustering algorithm to data sets having other than two dimensions of characteristics.

The goal of data clustering is to logically organize a set of input data into multiple data subsets (i.e., data clusters) for subsequent data processing. It is clear from inspection that the example data set that corresponds to the image 100 of FIG. 1 should be clustered into three data clusters 102, 104, and 106. A data clustering algorithm is designed to enable a computer to achieve that same result.

Figure 2:
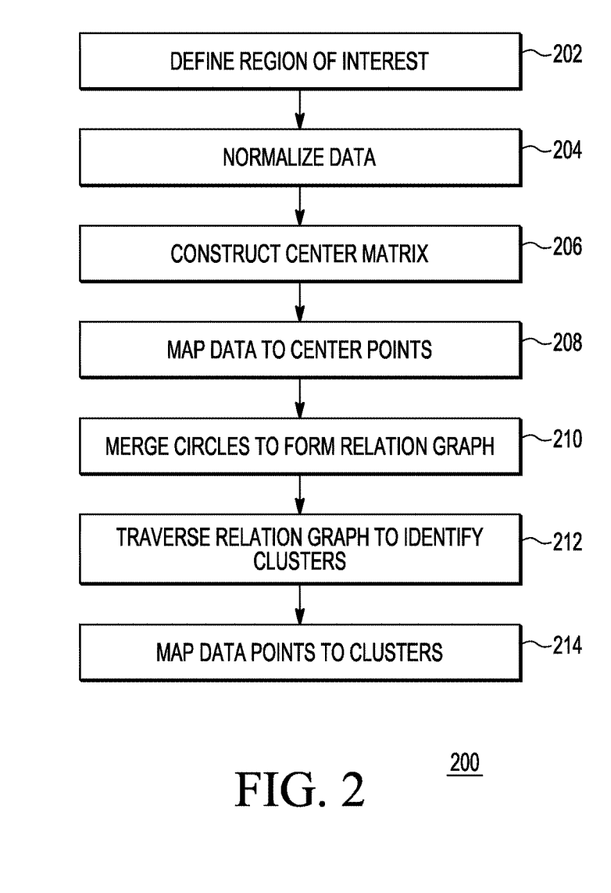
FIG. 2 is a flow chart of a data clustering algorithm according to one embodiment of the present invention.

FIG. 2 is a flow chart of a data clustering algorithm 200 according to one embodiment of the present invention. The data clustering algorithm 200 is applied to a set of input data"

to identify one or more data clusters, where each data cluster is a subset of the input data set.

The first step 202 in the data clustering algorithm 200 is to define a region of interest (ROI) for the input data set. In some implementations of the data clustering algorithm, the ROI definition step 202 defines an equilateral ROI, but, in general, the ROI does not have to be equilateral. The following description refers to an implementation in which the ROI is equilateral. Those skilled in the art will understand how to implement the invention for an ROI that is not equilateral.

For a two-dimensional data set, such as that corresponding to the two-dimensional image 100 of FIG. 1, an initial ROI is defined to be the smallest rectangular space that contains all of the input data points. The initial ROI is determined based on the range of X and Y coordinate values for the data set. Assume, for example, that the lowest X value in the data set is −47, and the highest X value in the data set is 104. Assume further that the lowest Y value in the data set is 13, and the highest Y value in the data set is 156. In that case, the initial ROI is the rectangular space bounded by the lines X=−47, X=104, Y=13, and Y=156. This initial ROI is (104−(−47)) or 151 units wide (i.e., in the X dimension) and (156−13) or 143 units high (i.e., in the Y dimension).

Since, in this implementation, step 202 defines an equilateral or square (in the case of two-dimensional data sets) ROI, the square ROI could be defined by increasing the height of the initial ROI by 8 units (by extending the top boundary of the initial ROI by 8 units or by extending the bottom boundary of the initial ROI by 8 units or by extending both the top and bottom boundaries by a total of 8 units). Such an augmented space would be a square ROI having both width and height of 151 units. Such a square ROI would represent an equilateral space having the smallest size that would contain all of the input data points in the set to be clustered, and that augmented space would be suitable as the square ROI for the data clustering algorithm 200 of FIG. 2. Note that, if the initial ROI happens to be equilateral, then the initial ROI is already suitable for use as the square ROI for this implementation of the data clustering algorithm 200.

The second step 204 in the data clustering algorithm 200 is to normalize the input data. Continuing with the same example input data set, the X coordinate values range from −47 to 104, and the Y coordinate values range from 13 to 156. In that case, assuming that the ROI is defined by extending at most only the top and right boundaries, the lower left corner of the square ROI lies at the point (X,Y)=(−47,13) in the Cartesian coordinate system for the input data set. In the data normalization step 204, the data points in the set are shifted by +47 units in the X dimension and by −13 units in the Y direction such that the lower left corner of the normalized ROI lies at the origin (0,0) of a Cartesian coordinate system for the normalized data set. In addition to linearly shifting the data coordinates, data normalization may also include scaling the data coordinates to range from 0 to 1 in each dimension. Such scaling makes the subsequent processing more generalized. Such scaling also transfers integer-based coordinates to floating point coordinates, which can make the processing more accurate. Note that, for a non-equilateral ROI, the data coordinates are scaled based on the length of the longest dimension of the ROI. In general, after the data points have been normalized, the coordinate values of the normalized data points will be relative to a point within the region of interest, such as the lower left corner. Those skilled in the art will understand that any point within the region of interest may be selected as the origin of the normalized Cartesian coordinate system.

Figure 3:
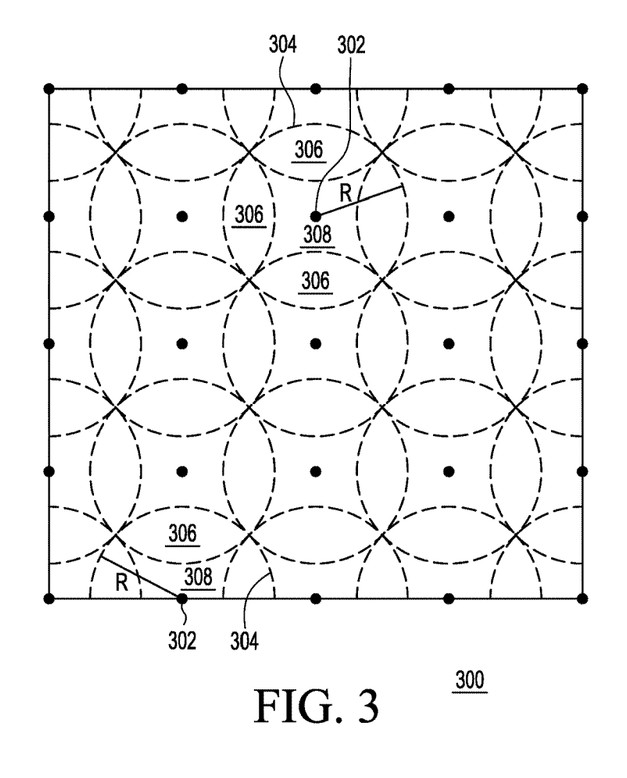
FIG. 3 is a graphical representation of an example center matrix for the data set represented in FIG. 1.

The next step 206 in the data-clustering algorithm 200 is to construct a center matrix for the ROI. FIG. 3 is a graphical representation of an example center matrix 300 for the data set represented in FIG. 1. In this particular example, the center matrix 300 is a (5×5) array of equally spaced center points 302 that span the ROI. The center matrix 300 has four center points 302 at the four corners of the ROI, another 12 center points 302 along the four sides of the ROI, and the remaining nine center points 302 within the interior of the ROI. In general, the total number Nc of center points 302 in the array for a center matrix is given by Equation (1) as follows:

$$Nc=Nin*P, \quad (1)$$

where Nin is the total number of input data points in the data set, and P is a specified precision parameter. For the example center matrix 300 of FIG. 3, if there are 5,000 input data points in the input data set of FIG. 1, then a precision parameter P of 0.01 will result in the array size Nc of 50.

As represented in FIG. 3, each center point 302 is the center of a circle 304 in the two-dimensional space having a radius R. Note that center points 302 that lie on the sides of the ROI correspond to semi-circles 304, while center points 302 that lie at the corners of the RIO correspond to quarter circles 304. The radius R corresponds to the smallest possible value such that each data point in the ROI lies within at least one circle 304. For this specification, a data point that is exactly R units away from a center point 302 is said to lie "within" the circle 304 corresponding to that center point 302. In the case of the two-dimensional space of FIG. 3, the radius R is equal to one-half the distance between diagonally adjacent center points 302. In general, for an N-dimensional data space, the radius R is defined by Equation (2) as follows:

$$R = \frac{G}{2}\sqrt{N}, \quad (2)$$

where G is the distance between closest adjacent center points in the N-dimensional data space (i.e., along one of the N dimensions).

As shown in FIG. 3, the circles 304 overlap such that each circle 304 has an overlap region 306 with each of its corresponding adjacent circles 304 and a non-overlap region 308 at the center of the circle 304. Thus, a circle 304 corresponding to a corner center point 302 has two overlap regions 306, a circle 304 corresponding to a side center point 302 has three overlap regions, and a circle 304 corresponding to an interior center point 302 has four overlap regions, while each circle 304 has exactly one non-overlap region 308.

Figure 4:
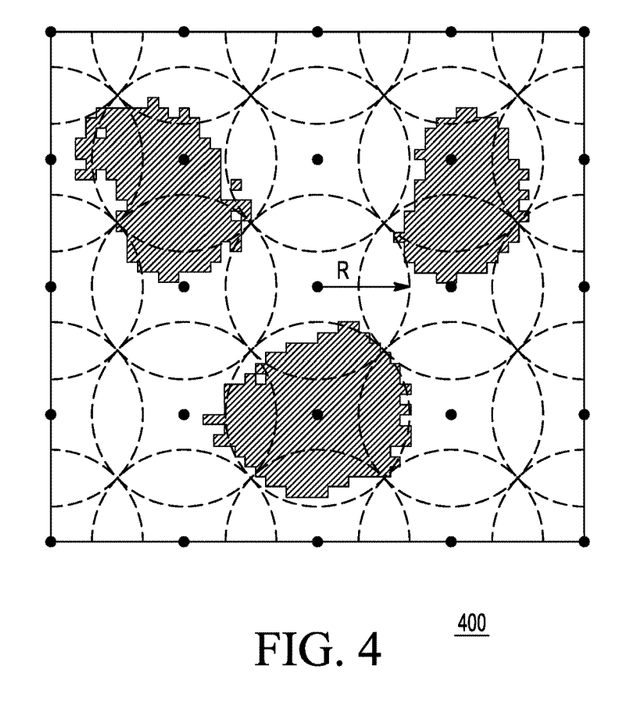
FIG. 4 is a graphical representation of an overlay image that corresponds to the center matrix of FIG. 3 overlaid onto the image of FIG. 1.

FIG. 4 is a graphical representation of an overlay image 400 that corresponds to the center matrix 300 of FIG. 3 overlaid onto the image 100 of FIG. 1. In general, each data point that lies within a non-overlap region 308 of a circle 304 lies within only that circle 304, while each data point that lies within an overlap region 306 of two adjacent circles 304 lies within both of those circles 304. Note that a data point that coincides with the intersection of four circles 304 lies within all four of those circles 304. For a three-dimensional data space, each data point will lie within up to eight different spheres. In general, for an N-dimensional data space, each data point will lie in up to $2^N$ different "hyperspheres."

Referring again to FIG. 2, the next step 208 in the data-clustering algorithm 200 is to logically map each data point in the set to its corresponding one, two, or four center points 302. Those data points that lie within non-overlap regions 308 get mapped to the single center point 302 of its corresponding circle 304, while those data points that lie in overlap regions 306 get mapped to the two center points 302 of its two corresponding circles 304. If a data point coincides with a four-circle intersection, then that data point will get logically mapped to the four center points 302 of those four corresponding circles 304. This data mapping step 208 can be accomplished by calculating the geometric distance d between each data point and each center point 302 in the center matrix 300. For the two-dimensional space of FIG. 4, the geometric distance d is given by Equation (3) as follows:

$$d = \sqrt{(X_D - X_C)^2 + (Y_D - Y_C)^2}, \quad (3)$$

where $(X_D, Y_D)$ are the coordinates of the data point and $(X_C, Y_C)$ are the coordinates of the center point 302. If a calculated distance d is less than or equal to the radius R such that the data point lies within the corresponding circle 304, then the data point is logically mapped to the corresponding center point 302; otherwise, the data point does not lie within that circle 304, and the data point is not logically mapped to that center point 302. For each center point 302$i$, a count $N_i$ of the number of data points lying within the corresponding circle 304$i$ is maintained. A count $NN_j$ of the number of data points lying within each overlap region 306$j$ is also maintained. If a data point is mapped to two (or four) different center points 302, then the count $NN_j$ of data points within the corresponding overlap region 306$j$ is incremented (by one).

The distance measure of equation (3) is based on a Euclidean distance. In alternative implementations, other suitable distance measures may be used such as (without limitation) those based on a Manhattan distance, a Chebyshev distance, and a Minkowski distance.

The next step 210 in the data clustering algorithm 200 is to merge appropriate pairs of adjacent circles 304 together. In one possible implementation, adjacent circles 304 are limited to consecutive circles in the same row or same column of the center matrix 300. In this particular implementation, diagonal circles 304 are not adjacent.

In general, if the overlap region 306 of two adjacent circles 304 contains a relatively large number $NN_j$ of data points compared to the total numbers $N_i$ of data points in one or both of those two circles 304, then it is appropriate to merge those two circles 304 together. One possible implementation of the circle-merging step 210 proceeds in one direction for each dimension. For example, the circle-merging step 210 may be implemented from left to right for each row of circles 304 in the center matrix 300 and from top to bottom for each column of circles 304 in the center matrix 300. For a given pair of adjacent circles 304-1 and 304-2, where the circle 304-1 is either to the left of the circle 304-2 or above the circle 304-2, the circle-merging step 210 may be implemented as follows:

Calculate the ratios R1=NN/N1 and R2=NN/N2, where NN is the number of data points lying within the overlap region 306 for the two adjacent circles 304-1 and 304-2, N1 is the number of data points lying within the circle 304-1, and N2 is the number of data points lying within circle 304-2;

Merge the two circles 304-1 and 304-2 if any one or more of the three following conditions (a), (b), or (c) is satisfied:
(a) If (i) both N1 and N2 are greater than K1 and if (ii) either R1 or R2 is greater than K2, where K1 is a specified density threshold whose value is selected to ignore circles 304 having only noise or only a few data points, and K2 is a specified minimum ratio threshold at which two circles can be merged;
(b) If (i) N1 is less than K1, and if (ii) N2 is greater than K1, and if (iii) R1 is greater than K3, where K3 is a specified minimum ratio threshold for determining that the circle is at an edge of a data cluster; and
(c) If (i) N1 is greater than K1, and if (ii) N2 is less than K1, and if (iii) R2 is greater than K3.

Note that, if condition (b) is satisfied, then the circle 304-1 is located at the edge of the corresponding data cluster, while, if condition (c) is satisfied, then the circle 304-2 is located at the edge of the corresponding data cluster. If a circle 304$i$ is not merged with any of its adjacent circles 304 and if its total number of data points $N_i$ is less than or equal to the density threshold K1, then the circle 304$i$ is ignored as containing only noise. If a circle 304$i$ is not merged with any of its adjacent circles 304 and if its total number of data points $N_i$ is greater than the density threshold K1, then the circle 304$i$ is determined to have its own data cluster that lies entirely within the circle 304$i$.

Figure 5:
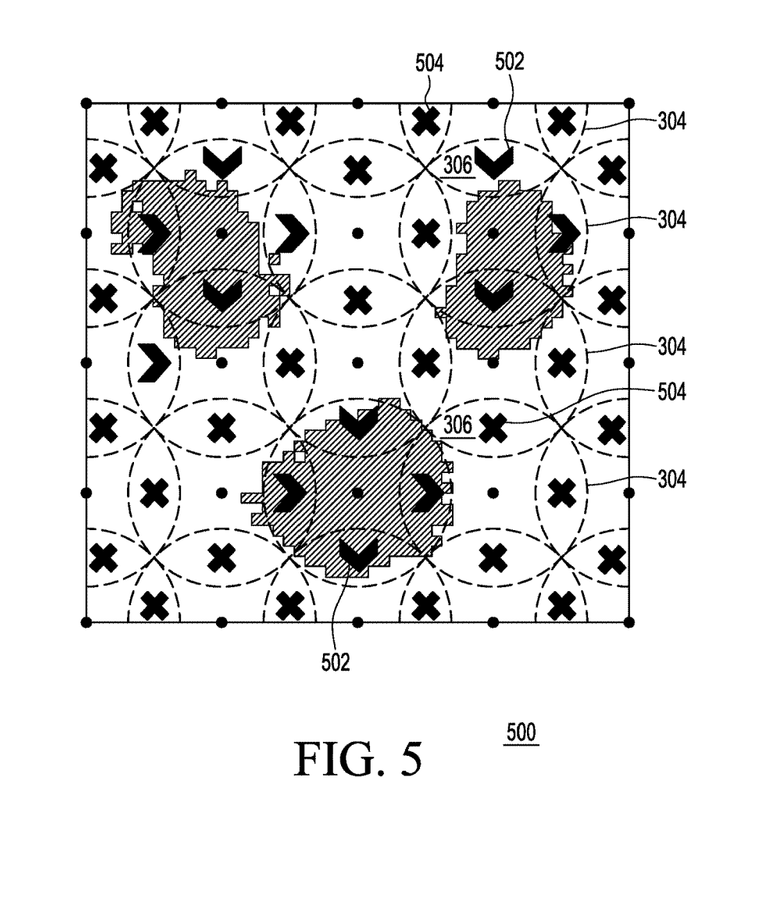
FIG. 5 is a graphical representation of a relation graph generated by performing the circle-merging step of FIG. 2 for the example overlay image of FIG. 4.

FIG. 5 is a graphical representation of a relation graph 500 generated by performing the circle-merging step 210 of FIG. 2 for the example overlay image 400 of FIG. 4. In FIG. 5, each arrow 502 lying in an overlap region 306 indicates that the two corresponding adjacent circles 304 were merged during the circle-merging step 210. Each cross 504 lying in an overlap region 306 indicates that the two corresponding adjacent circles 304 were not merged during the circle merging step 210. Note that, since the circle-merging step 210 was implemented from left to right and from top to bottom, each arrow 502 points either right or down. At this point in the process, information exists at the level of adjacent pairs of circles 304 as to whether or not each pair has been merged.

The next step 212 in the data clustering algorithm 200 is to traverse the relation graph to identify multiple pairs of merged circles that belong to the same data cluster. For example, if (i) circle 304-1 has merged with circle 304-2 and (ii) circle 304-2 has been merged with circle 304-3, then all three circles 304-1, 304-2, and 304-3 should belong to the same data cluster. The example relation graph 500 of FIG. 5 can be traversed in a raster-scan pattern from left to right and from top to bottom analyzing each circle 304 to locate merged circles 304. When a merged circle 304 is located, a new cluster is created, and the sequence of adjacent circles 304 are analyzed both down as well as left to right to locate corresponding merged circles 304 of the same cluster. If a circle 304 has been merged with one or more other circles 304, then the first circle 304 and the one or more other circles 304 are all associated with the same cluster. If any of those other circles 304 have been further merged with still other circles 304, then those still other circles 304 are also associated with that same cluster. At the end of the graph-traversal step 212, one or more clusters will have been identified with each cluster having one or more associated circles.

Figure 6:
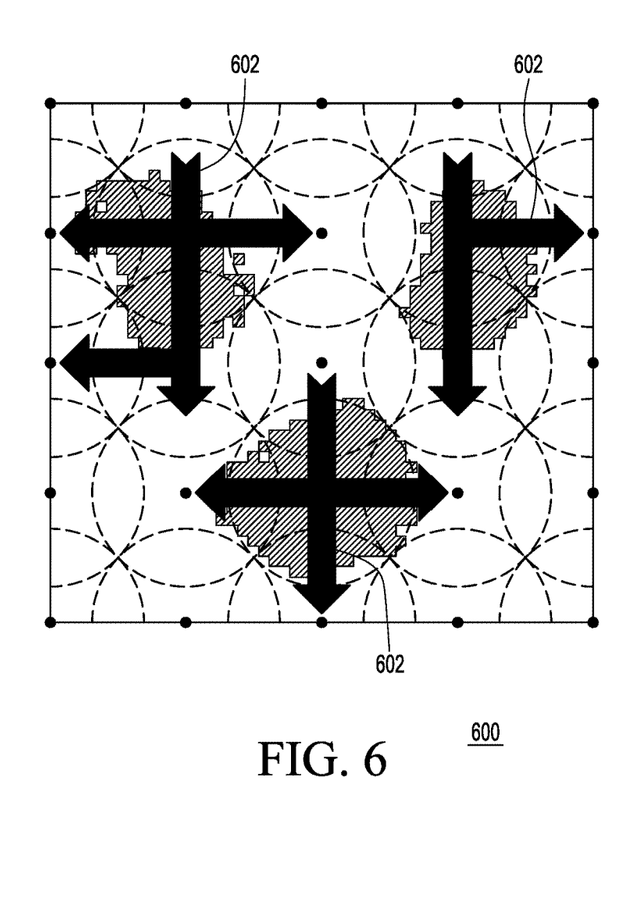
FIG. 6 is a graphical representation of the tree image generated by performing the graph traversal step of FIG. 2 on the relation graph of FIG. 5.

FIG. 6 is a graphical representation of the tree image 600 generated by performing the graph-traversal step 212 on the relation graph 500 of FIG. 5. As shown in FIG. 6, the tree image 600 contains three distinct tree structures 602, each of which identifying the one or more circles 304 belong to a different, associated cluster. In general, if any part of a tree structure 602 overlays any part of a circle 304, then that circle 304 is part of the associated cluster.

The next and last step 214 in the data-clustering algorithm 200 of FIG. 2 is to map data points to their associated data cluster. In particular, if a data point lies within a circle that is associated with a cluster, then that data point is mapped to that cluster. Note that there may be data points that lie in circles that are not associated with any clusters. Those data points will not be included in any data clusters and are assumed to be noise or at least ignorable. At the completion of the data-clustering algorithm 200, one or more data clusters will have been identified, each of which containing a different, non-overlapping subset of the original data points. Those one or more data clusters may then be subjected to whatever suitable data processing is warranted for the particular, overall data processing application.

The data clustering algorithm 200 of FIG. 2 can be less computationally intense than conventional data-clustering algorithms. One reason for the reduced computations of the data clustering algorithm 200 is that the mapping of data points (i.e., step 208 of FIG. 2) is based on fixed center points, while conventional data-clustering algorithms like the K-means algorithm are based on dynamic center points that move as the data clusters grow.

Nevertheless, the data clustering algorithm 200 can still be computationally intense, especially for large numbers of data points and/or numbers of dimensions of data characteristics greater than two. It is therefore useful to implement the data-clustering algorithm 200 on a heterogeneous platform having multiple processors of different types operating in parallel.

Figure 7:
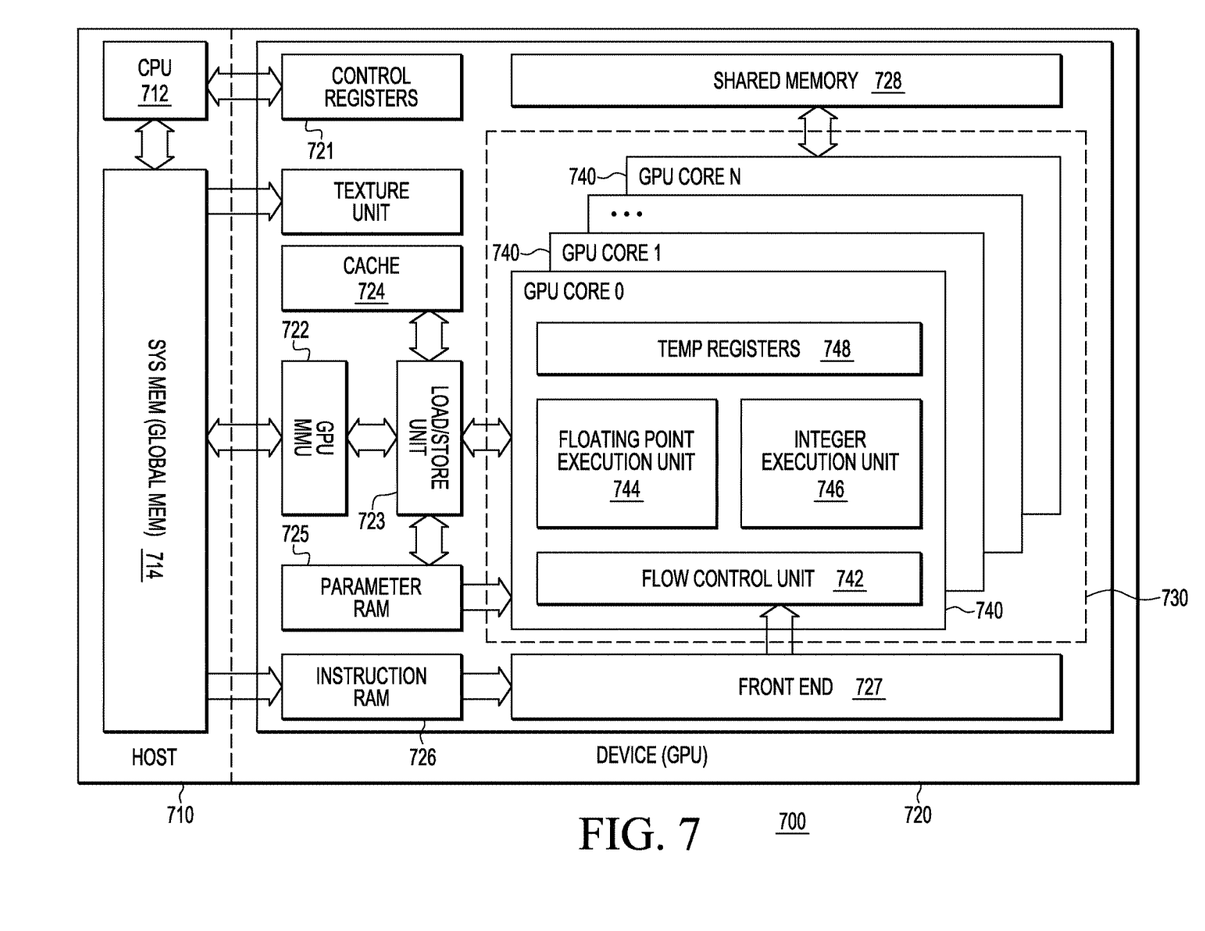
FIG. 7 is a high level schematic block diagram of a heterogeneous computer system suitable for implementing the data clustering algorithm of FIG. 2.

FIG. 7 is a high level block diagram of a heterogeneous computer system 700 suitable for implementing the data clustering algorithm 200 of FIG. 2. Computer system 700 has an ARM (advanced RISC (reduced instruction set computer) machine) architecture that includes (i) a host 710 comprising a central processing unit (CPU) 712 and SDRAM (Synchronous Dynamic Random Access Memory) system memory 714 and (ii) a graphical processing unit (GPU) device 720 comprising a number of GPU cores 740 configured to operate in parallel in a GPU processing unit 730. Note that, since the CPU 712 and the GPU device 720 share the system memory 714, the system memory 714 can be used as global memory for both the CPU 712 and the GPU device 720. By mapping the address space of the system memory 714 between the CPU 712 and the GPU device 720, data transfer requirements can be reduced.

Figure 8:
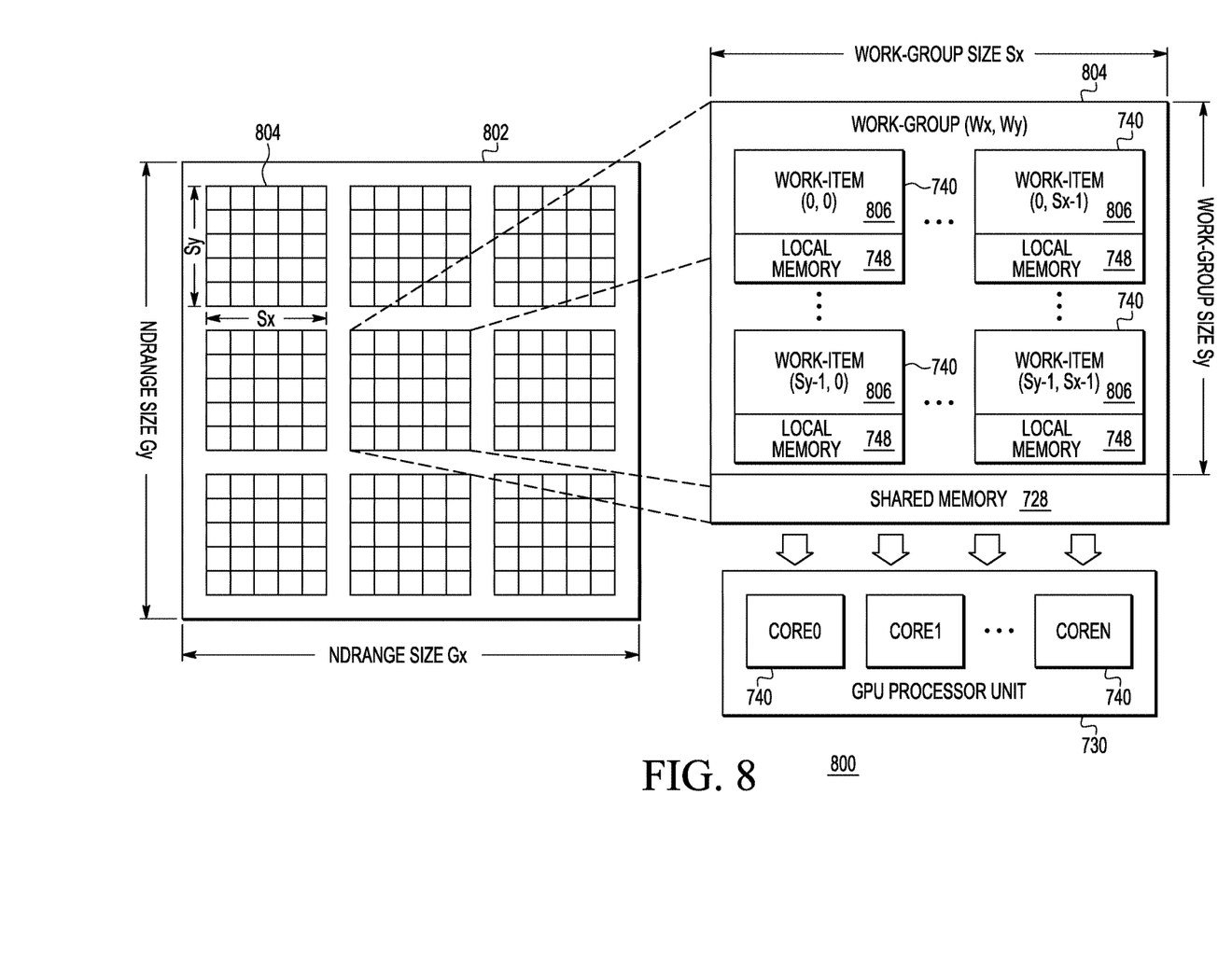
FIG. 8 is a graphical representation of a software framework for the multiple GPU cores of FIG. 7 implementing the center-mapping step of the data clustering algorithm of FIG. 2 in a simultaneous, multi-tasking manner on the heterogeneous computer system of FIG. 7.

In addition to the GPU processing unit 730, the GPU device 720 also comprises control registers 721 that store control values that control GPU behavior and features, a memory controller comprising a GPU memory management unit (MMU) 722, a load/store unit 723, and a memory cache 724, a parameter RAM (Random Access Memory) 725 that stores parameter values; an instruction RAM 726 that stores the GPU shader instructions that process the data clusters generated by the data-clustering algorithm 200, a front end 727 that loads and analyzes the GPU shader instructions, and a shared memory 728 used by the work items in a work group implemented using the GPU cores 740 (explained below with reference to FIG. 8).

Each GPU core 740 comprises a flow control unit 742 that controls the flow of data into and out of the GPU core 740, a floating-point execution unit 744 configured to perform floating-point calculations of the GPU core 740, an integer execution unit 746 configured to perform integer calculations of the GPU core 740, and temporary registers 748 that provide private memory for the GPU core 740.

In one possible implementation, the different GPU cores 740 operate in parallel to perform the data-mapping step 208 of the data-clustering algorithm 200 of FIG. 2 simultaneously for different subsets of the data and/or for different center points 302 of the center matrix 300 of FIG. 3, while the CPU 712 performs the rest of the steps of the data-clustering algorithm 200. Note that the CPU 712 can perform the circle-merging step 210 of the data-clustering algorithm 200 in a parallel pipeline manner with the GPU cores 740 performing the data-mapping step 208. For example, as soon as the GPU cores 740 cores complete the data-mapping step 208 for two adjacent center points 302, the CPU 712 can apply the circle-merging step 210 to the two corresponding overlapping circles 304, while the GPU cores 740 perform the data-mapping step 208 for other center points 302.

Note that, in some implementations, the heterogeneous computer system 200 has a controller (not shown) that can dynamically allocate different data-clustering operations to the CPU 712 and the GPU device 720 based on the amount of data to be clustered. For example, for small data sets, the entire data-clustering algorithm may be performed by the CPU 712.

FIG. 8 is a graphical representation of an OpenCL (Open Computing Language) software framework 800 for the multiple GPU cores 740 implementing the data-mapping step 208 of the data-clustering algorithm 200 of FIG. 2 in a simultaneous, multi-tasking manner on the heterogeneous computer system 700 of FIG. 7.

In the proposed implementation, the data-mapping step 208 is performed for multiple center points 302 at the same time, where the mapping procedure is the same for each center point 302, and the execution instructions are the same for each parallel process. The difference between the different parallel processes is the data being processed. Such a parallelizing mode is referred to as SIMD (single instruction multiple data) processing. In FIG. 7, the GPU device 720 has multiple GPU cores 740 and a front end 727. The front end 727 offers the same instructions for the different GPU cores 740 to run, but the different GPU cores 740 get different data from the system memory 714.

In the OpenCL framework 800 of FIG. 8, an abstract concept called a work item 806 is proposed to represent the processing that will be done in one GPU core 740 of FIG. 7. In this disclosure, a work item 806 corresponds to the calculations associated with the data-mapping step 208 for one center point 302 of the center matrix 300 of FIG. 3. A work group 804 contains multiple work items 806, which means the mapping for several center points 302 can be done simultaneously by the GPU device 720. In one possible implementation, the data-mapping step 208 is performed row by row. Thus, for the (5×5) center matrix 300 of FIG. 3, five GPU cores 740 operate in parallel for each row of the center matrix 300.

In this case, all of the calculations associated with the data-mapping step 208 are represented as an array 802 in FIG. 8. The array 802 represents the center matrix 300 defined in the matrix-construction step 206 of the data-clustering algorithm 200, where each center point 302 has been mapped into a work item 806, where the computation of the distances between all of the input data points and the corresponding center point 302 happens. Each work item 806 has global coordinates (Gx,Gy) in NDR (N-Dimension Range) space.

Several conjoint work items 806 can form a work group 804, in which all of the work items 806 share the same local memory 748 and are executed by different GPU cores 740 in the GPU processor unit 730 simultaneously. Likewise, the work group 804 has its own global coordinates (Wx,Wy) and dimensions (Sx,Sy). Thus, the local coordinates (Lx,Ly) of a work item 806 in a work group 804 are given by the following formula:

$$Lx=Gx-Wx*Sx$$

$$Ly=Gy-Wy*Sy$$

In general, the smaller the value of the precision parameter P used in Equation (1), the greater the fidelity of the data-clustering algorithm, but the greater the computational load because smaller precision parameter values mean both more center points in the center matrix and smaller corresponding circles. The value of the precision parameter P can be selected to achieve a balance between the competing goals of increased fidelity and decreased computational load.

Although the data clustering algorithm 200 of FIG. 2 has been described as being implemented by the heterogeneous computer system 700 of FIG. 7, those skilled in the art will understand that the data-clustering algorithm 200 can be implemented by other computer systems. For example, such other computer systems may have suitable parallel processing units other than GPUs. Still other computer systems may have a single GPU or other suitable accelerator or hardware-assist processor in addition to the CPU. Still other computer systems might not be heterogeneous at all with all processing implemented on a CPU.

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. A computer-implemented method for generating one or more data clusters for a set of data points, wherein the computer includes a central processing unit (CPU), a plurality of parallel processing units and a system memory shared by the CPU and the parallel processing units, the method comprising:
   (a) the CPU defining a region of interest containing the data points by:
      (a1) identifying smallest and largest coordinate values of the data points to identify an initial region of interest containing the data points; and
      (a2) if the initial region of interest is not equilateral, then increasing the size of the initial region of interest in one or more dimensions to define an equilateral region of interest containing the data points;
   (b) the CPU defining a center matrix for the region of interest, wherein the center matrix comprises an array of center points defining centers of overlapping circles;
   (c) the parallel processing units mapping the data points to corresponding circles based on near center points;
   (d) the CPU determining whether to merge adjacent pairs of overlapping circles based on the mapped data points;
   (e) the CPU identifying circles belonging to the one or more data clusters based on merged pairs of overlapping circles; and
   (f) the CPU identifying data points belonging to the one or more data clusters based on the identified circles.

2. The method of claim 1, wherein:
the circles have radii of identical length such that each data point is located within either a single circle or the overlap region between two or more circles.

3. The method of claim 1, wherein step (c) comprises:
   (c1) calculating a distance from each data point to each center point; and
   (c2) if the distance between a data point and a center point is determined to be less than or equal to the radius of the circle corresponding to the center point, then determining that the data point is located within the circle; otherwise, determining that the data point is not located within the circle.

4. The method of claim 1, wherein the computer determines whether to merge adjacent pairs of overlapping circles based on relative numbers of data points lying in overlap regions of the adjacent pairs of overlapping circles compared to total numbers of data points within the corresponding circles.

5. The method of claim 4, wherein step (d) comprises, for two overlapping circles that share an overlap region:
   (d1) generating overlap metrics relating the number of data points in the overlap region to the total number of data points in each corresponding overlapping circle; and
   (d2) determining whether to merge the two overlapping circles into a merged pair based on the overlap metrics.

6. The method of claim 1, wherein step (e) comprises traversing a relation graph of the merged pairs of overlapping circles to identify one or more circles belonging to each different data cluster.

7. A computer system for generating one or more data clusters for a set of data points, the computer system comprising:
   a central processing unit (CPU);
   a plurality of parallel processing units; and
   system memory shared by the CPU and the parallel processing units, wherein the computer system implements a data-clustering algorithm by:
      (a) the CPU defining a region of interest containing the data points;
      (b) the CPU defining a center matrix for the region of interest, wherein the center matrix comprises an array of center points defining centers of overlapping circles;
      (c) the parallel processing units mapping the data points to corresponding circles based on near center points;
      (d) the CPU determining whether to merge adjacent pairs of overlapping circles based on the mapped data points;
      (e) the CPU identifying circles belonging to the one or more data clusters based on merged pairs of overlapping circles; and
      (f) the CPU identifying data points belonging to the one or more data clusters based on the identified circles, wherein the parallel processing unites map the data points by:
         (c1) calculating a distance from each data point to each center point; and
         (c2) if the distance between a data point and a center point is less than or equal to the radius of the circle corresponding to the center point, then determining that the data point is located within the circle, otherwise, determining that the data point is not located within the circle.

8. The computer system of claim 7, wherein the parallel processing units are graphics processing units.

9. The computer system of claim 7, wherein the computer system is configured to define the region of interest by normalizing the coordinate values of the data points to be relative to a point within the region of interest.

10. The computer system of claim 7, wherein:
the circles have radii of identical length such that each data point is located within either a single circle or the overlap region between two or more circles.

11. A computer system for generating one or more data clusters for a set of data points, the computer system comprising:
   a central processing unit (CPU);
   a plurality of parallel processing units; and
   system memory shared by the CPU and the parallel processing units, wherein the computer system implements a data-clustering algorithm by:
      (a) the CPU defining a region of interest containing the data points;
      (b) the CPU defining a center matrix for the region of interest, wherein the center matrix comprises an array of center points defining centers of overlapping circles;
      (c) the parallel processing units mapping the data points to corresponding circles based on near center points;
      (d) the CPU determining whether to merge adjacent pairs of overlapping circles based on relative numbers of data points lying in overlap regions of the adjacent pairs of overlapping circles compared to total numbers of data points within the corresponding circles;
      (e) the CPU identifying circles belonging to the one or more data clusters based on merged pairs of overlapping circles; and
      (f) the CPU identifying data points belonging to the one or more data clusters based on the identified circles.

12. The computer system of claim 11, wherein, for two overlapping circles that share an overlap region, the computer system is configured to determine whether to merge pairs of overlapping circles by:
    (d1) generating overlap metrics relating the number of data points in the overlap region to the total number of data points in each corresponding overlapping circle; and
    (d2) determining whether to merge the two overlapping circles into a merged pair based on the overlap metrics.

13. A computer system for generating one or more data clusters for a set of data points, the computer system comprising:
    a central processing unit (CPU);
    a plurality of parallel processing units; and
    system memory shared by the CPU and the parallel processing units, wherein the computer system implements a data-clustering algorithm by:
        (a) the CPU defining a region of interest containing the data points;
        (b) the CPU defining a center matrix for the region of interest, wherein the center matrix comprises an array of center points defining centers of overlapping circles;
        (c) the parallel processing units mapping the data points to corresponding circles based on near center points;
        (d) the CPU determining whether to merge adjacent pairs of overlapping circles based on the mapped data points;
        (e) the CPU identifying circles belonging to the one or more data clusters based on merged pairs of overlapping circles; and
        (f) the CPU identifying data points belonging to the one or more data clusters based on the identified circles by traversing a relation graph of the merged pairs of overlapping circles to identify one or more circles belonging to each different data cluster.

* * * * *